United States Patent
White

(10) Patent No.: US 7,921,243 B1
(45) Date of Patent: *Apr. 5, 2011

(54) SYSTEM AND METHOD FOR A DDR SDRAM CONTROLLER

(75) Inventor: Theodore C. White, Rancho Santa Margarita, CA (US)

(73) Assignee: Marvell International Ltd., Hamilton (BM)

( * ) Notice: Subject to any disclaimer, the term of this patent is extended or adjusted under 35 U.S.C. 154(b) by 1077 days.

This patent is subject to a terminal disclaimer.

(21) Appl. No.: 11/649,982

(22) Filed: Jan. 5, 2007

(51) Int. Cl.
G06F 13/12 (2006.01)
G06F 13/38 (2006.01)
G06F 13/00 (2006.01)

(52) U.S. Cl. .......... 710/62; 710/100; 710/315; 710/307

(58) Field of Classification Search .................. 710/62, 710/100, 315, 307
See application file for complete search history.

(56) References Cited

U.S. PATENT DOCUMENTS

| | | | | |
|---|---|---|---|---|
| 3,483,523 A | * | 12/1969 | Ming et al. | 341/24 |
| 4,962,498 A | * | 10/1990 | May, Jr. | 370/474 |
| 5,408,613 A | * | 4/1995 | Okabayashi | 709/234 |
| 5,453,959 A | * | 9/1995 | Sakuta et al. | 365/189.09 |
| 5,490,252 A | * | 2/1996 | Macera et al. | 709/249 |
| 6,009,107 A | * | 12/1999 | Arvidsson et al. | 370/535 |
| 6,088,762 A | * | 7/2000 | Creta | 711/106 |
| 6,400,730 B1 | * | 6/2002 | Latif et al. | 370/466 |
| 6,725,293 B1 | * | 4/2004 | Nakayama et al. | 710/36 |
| 6,847,410 B1 | * | 1/2005 | Scheffler | 348/714 |
| 2004/0228166 A1 | * | 11/2004 | Braun et al. | 365/154 |
| 2006/0174152 A1 | * | 8/2006 | Millman | 713/503 |

* cited by examiner

Primary Examiner — Alford W Kindred
Assistant Examiner — Farley J Abad

(57) ABSTRACT

A buffer control system for a data storage device controller comprises a command module and a burst module. The command module receives first channel data from a first channel having a first data format and second channel data from a second channel having a second data format and converts the first channel data and the second channel data to respective data packets each having a third data format that is different than the first data format and the second data format. The burst module that selectively transmits the data packets having the third data format to a memory in a single write burst.

48 Claims, 11 Drawing Sheets

| | Internal Bus Width | BUFCLK/BCCLK Clock Ratio | Burst Length | External Bus Width |
|---|---|---|---|---|
| Configuration 1 | 64 | 1 | 2 | 32 |
| Configuration 2 | 64 | 2 | 4 | 16 |
| Configuration 3 | 128 | 2 | 4 | 32 |
| Configuration 4 | 128 | 4 | 8 | 16 |

FIG. 4

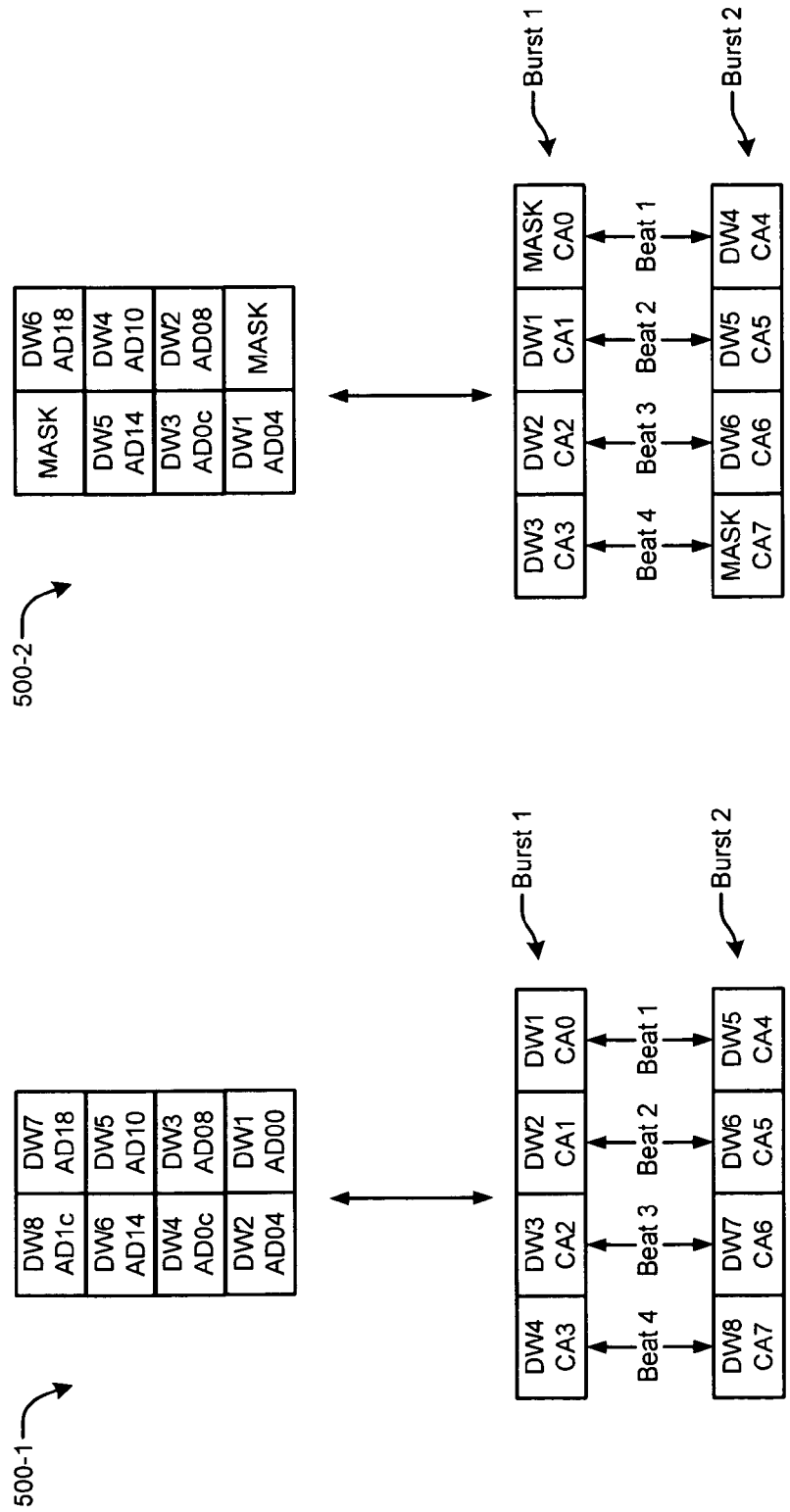

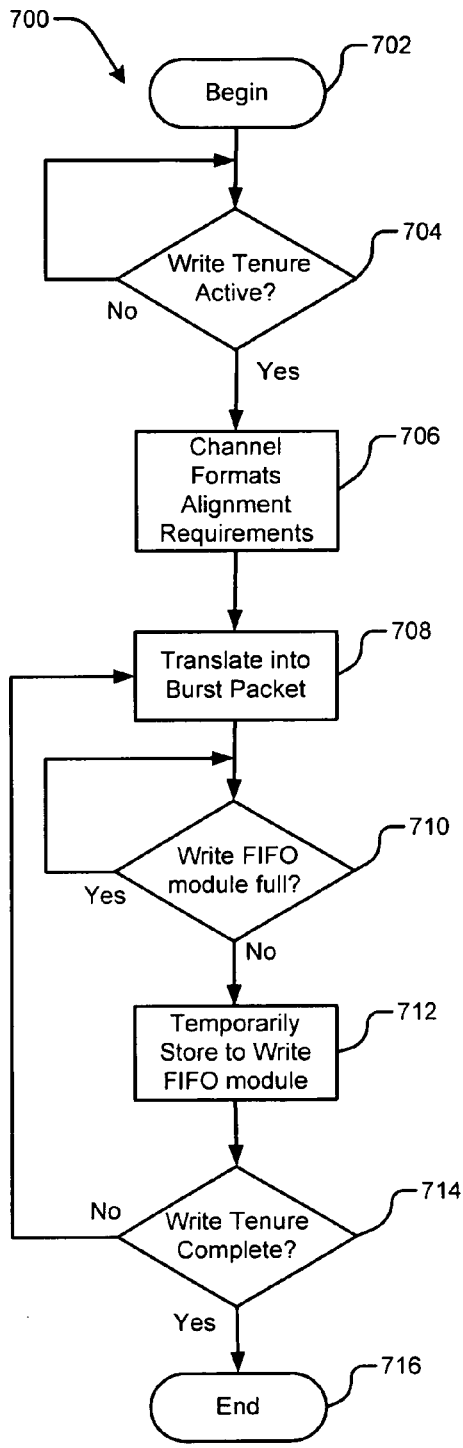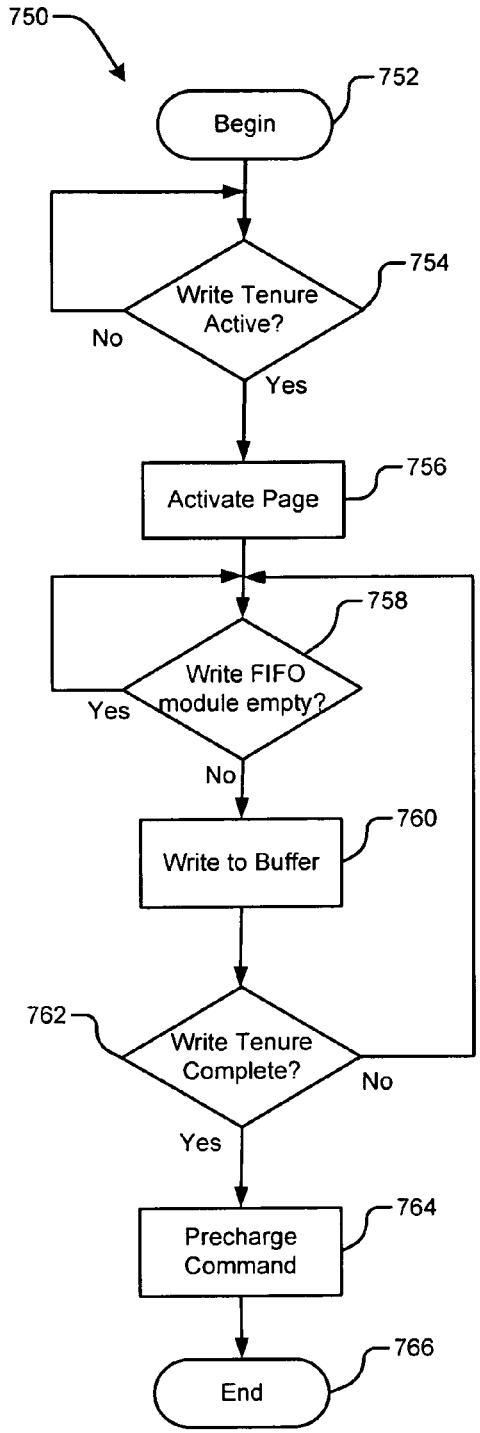
FIG. 7A
FIG. 7B

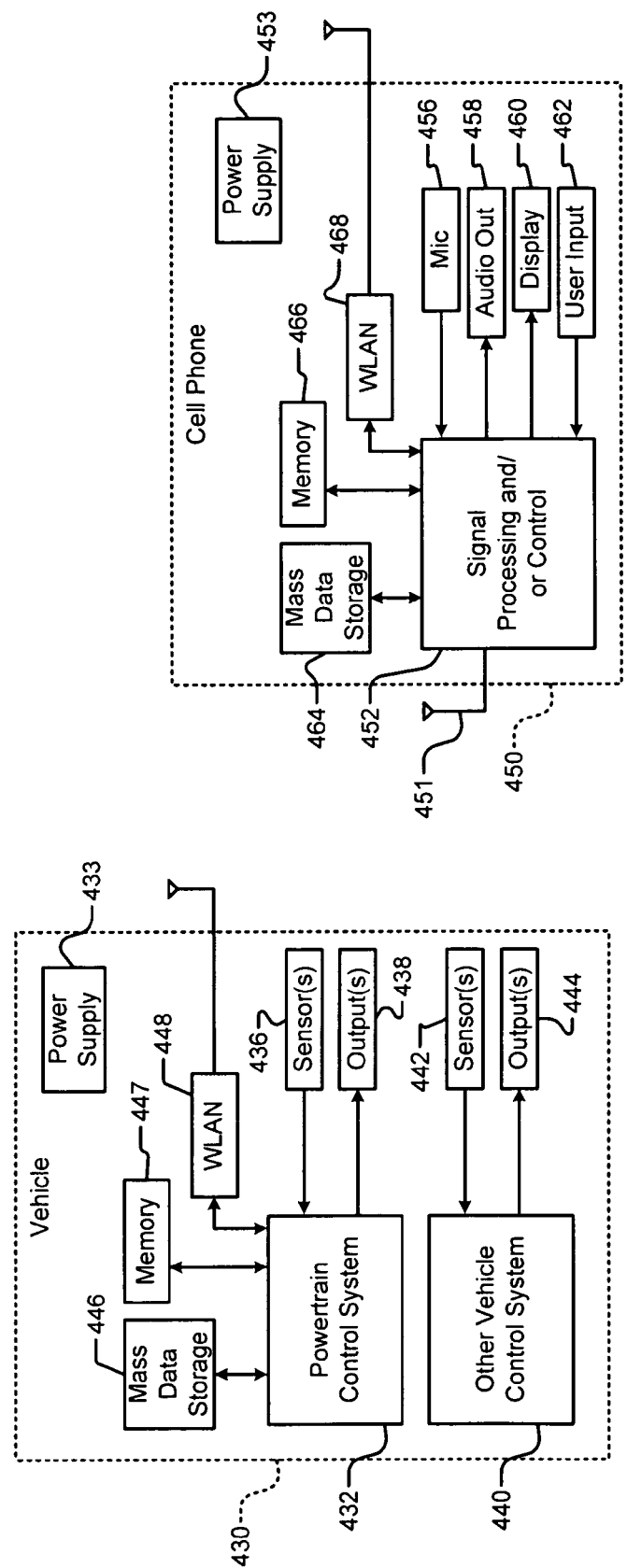

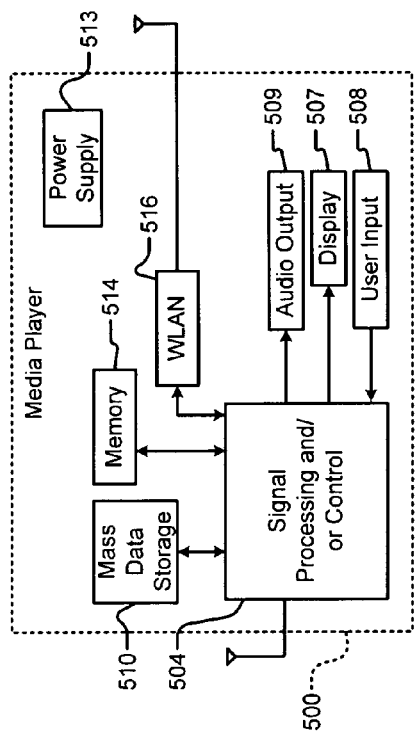
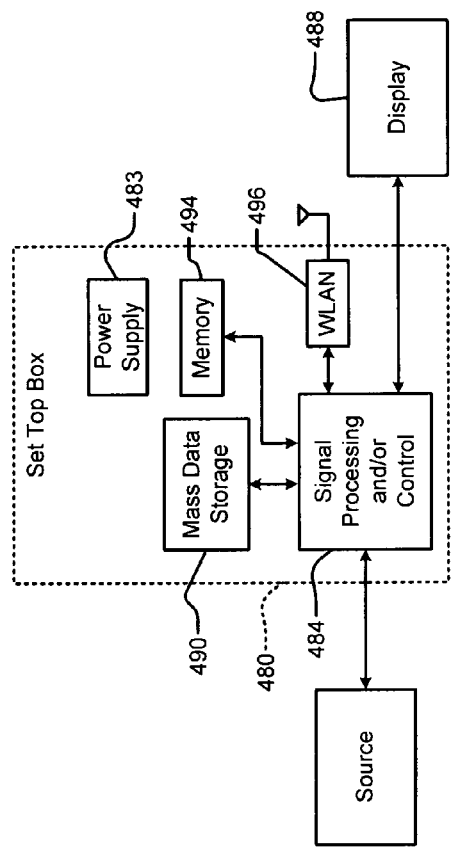
FIG. 9F
FIG. 9E

SYSTEM AND METHOD FOR A DDR SDRAM CONTROLLER

FIELD

The present disclosure relates generally to storage device controllers, and more particularly to efficient storage device controllers.

BACKGROUND

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

A hard disk controller (HDC) communicates with the storage device and the host system. The HDC manages interaction between the storage device and the host system. Communication between the host system and the HDC is usually provided using one of a variety of standard I/O bus interfaces. Typically, when data is read from a storage device, a host system sends a read command to the HDC, which stores the read command into a buffer memory. Data is read from the storage device and stored in the buffer memory.

The buffer memory typically employs volatile memory having low latency. Double data rate synchronous dynamic random access memory (DDR) may be used as the buffer memory. The DDR transfers data on a rising and falling edge of a clock signal of the HDC. The transfer rate of the DDR is double the transfer rate of a synchronous random access memory (SDRAM).

A DDR SDRAM controller writes or reads data to or from the DDR SDRAM. The DDR SDRAM controller receives transfer requests from channels of an HDD system. Typically, DDR SDRAM controllers accommodate various formats of the transfer requests and store and/or retrieve data to and/or from a buffer using the various formats.

SUMMARY

A buffer control system for a data storage device controller comprises a command module and a burst module. The command module receives first channel data from a first channel having a first data format and second channel data from a second channel having a second data format and converts the first channel data and the second channel data to respective data packets each having a third data format that is different than the first data format and the second data format. The burst module selectively transmits the data packets having the third data format to a memory in a single write burst.

In other features, the command module receives the data packets from the memory and converts the data packets to the first channel data having the first channel format and the second channel data having the second channel format. The command module includes a write data module that reformats the first channel format and the second channel format to the third data format. The system further comprises a timing module, wherein the write data module inserts byte parity into the data packets and the timing module verifies the byte parity.

In other features, the third data format includes a data packet length of two units or four units and includes data stored to the memory beginning at an even address boundary of the memory. Each unit of the two units and the four units corresponds to a data qualifier strobe signal. The system further comprises a write first-in-first-out (FIFO) module that stores a portion of each of the data packets until the write data module completely translates one of the first channel data and the second channel data to the third data format. A size of the write FIFO module adapts to a size of one of the data packets translated by the write data module. The burst module transfers one of the data packets to the memory when the write data module completely translates one of the first channel data and the second channel data to the third data format. The burst module stops transferring one of the data packets when the burst module detects an empty signal from the write FIFO module.

In other features, the conversion of the data packets is based on at least one of a size of one of the data packets, an alignment of a first-in-first-out (FIFO) memory of one of the first channel and the second channel, an initial address of the memory, and a length of one of the data packets. The timing module performs delay alignment functions on data that is at least one of transmitted from the memory and transmitted to the memory. The timing module performs delays of data qualifier signals based on digital locked loops.

In other features, the system further comprises a read FIFO module that receives at least one of the data packets from the memory and converts the at least one of the data packets from a data qualifier signal domain to a memory control clock domain. The system further comprises at least one pair of capture flip-flops that perform duplicate error detection. The system further comprises a capture module that inserts byte parity in at least one of the data packets. The command module includes a read data module that modifies an alignment and an address of at least one of the data packets received from the read FIFO module.

In other features, the command module includes a tenure module that controls a tenure state within at least one of the command module and the burst module. The tenure state includes one of an active state, a pause state, and an idle state. The command module includes an address generation module that generates a decoded address signal based on an initial channel address of one of the first channel and the second channel. The system further comprises a refresh request module that requests at least one of refresh cycles and programmable refresh cycles based on information supplied by the internal interface. The refresh request module uses a distributed refresh technique.

In other features, the burst module executes a plurality of protocol operations of the memory. Each of the protocol operations include at least one of an activate command, a write command, a read command, a self refresh command, a buffer initialization command, a pre-charge command, and a digitally locked loop initialization command. The burst module enters a wait state before executing consecutive ones of the protocol commands. The burst module generates an adjustment time parameter that provides a counter for at least one of a new protocol command and a missing protocol command.

In other features, the command module operates on a buffer control clock and the memory operates on a buffer clock, the buffer control clock operates at one of a rate of the buffer clock and double the rate of the buffer clock. The system further comprises an arbitration module that monitors the internal interface and grants access to one of the first channel and the second channel based on a channel request priority among the first and second channels. The single write burst writes the data packets to a location in the memory that begins at an even address of the memory. The timing module detects an error when the data packets include padded data corresponding to a first mask bit that is reset and the timing module detects an error when the data packets include at least one of first channel data associated with a second mask bit that is set and second channel data associated with a third mask bit that is set.

A buffer control system for a data storage device controller comprises command means for receiving first channel data from a first channel having a first data format and second channel data from a second channel having a second data format and converting the first channel data and the second channel data to respective data packets each having a third data format that is different than the first data format and the second data format and burst means for selectively transmitting the data packets having the third data format to a memory in a single write burst.

In other features, the command means receives the data packets from the memory and converts the data packets to the first channel data having the first channel format and the second channel data having the second channel format. The command means includes write data means for reformatting the first channel format and the second channel format to the third format. The system further comprises timing means, wherein the write data means inserts byte parity into the data packets and the timing means verifies the byte parity.

In other features, the third data format includes a data packet length of two units or four units and includes data stored to the memory beginning at an even address boundary of the memory. Each unit of the two units and the four units corresponds to a data qualifier strobe signal. The system further comprises write first-in-first-out (FIFO) means for storing a portion of each of the data packets until the write data means completely translates one of the first channel data and the second channel data to the third data format. A size of the write FIFO means adapts to a size of one of the data packets translated by the write data means. The burst means transfers one of the data packets to the memory when the write data means completely translates one of the first channel data and the second channel data to the third data format. The burst means stops transferring one of the data packets when the burst means detects an empty signal from the write FIFO means.

In other features, the conversion of the data packets is based on at least one of a size of one of the data packets, an alignment of a first-in-first-out (FIFO) memory of one of the first channel and the second channel, an initial address of the memory, and a length of one of the data packets. The timing means perform delay alignment functions on data that is at least one of transmitted from the memory and transmitted to the memory. The timing means performs delays of data qualifier signals based on digital locked loops.

In other features, the system further comprises read FIFO means for receiving at least one of the data packets from the memory and converting the at least one of the data packets from a data qualifier signal domain to a memory control clock domain. The system further comprises at least one pair of capture flip-flops means for performing duplicate error detection. The system further comprises capture means for inserting byte parity in at least one of the data packets. The command means includes read data means for modifying an alignment and an address of at least one of the data packets received from the read FIFO means.

In other features, the command means includes tenure means for controlling a tenure state within at least one of the command means and the burst means. The tenure state includes one of an active state, a pause state, and an idle state. The command means includes address generation means for generating a decoded address signal based on an initial channel address of one of the first channel and the second channel.

The system further comprises refresh request means for requesting at least one of refresh cycles and programmable refresh cycles based on information supplied by the internal interface. The refresh request means uses a distributed refresh technique.

In other features, the burst means executes a plurality of protocol operations of the memory. Each of the protocol operations include at least one of an activate command, a write command, a read command, a self refresh command, a buffer initialization command, a pre-charge command, and a digitally locked loop initialization command. The burst means enters a wait state before executing consecutive ones of the protocol commands. The burst means generates an adjustment time parameter that provides a counter for at least one of a new protocol command and a missing protocol command.

In other features, the command means operates on a buffer control clock and the memory operates on a buffer clock, the buffer control clock operates at one of a rate of the buffer clock and double the rate of the buffer clock. The system further comprises arbitration means for monitoring the internal interface and granting access to one of the first channel and the second channel based on a channel request priority among the first and second channels. The single write burst writes the data packets to a location in the memory that begins at an even address of the memory. The timing means detects an error when the data packets include padded data corresponding to a first mask bit that is reset and the timing means detects an error when the data packets includes at least one of first channel data associated with a second mask bit that is set and second channel data associated with a third mask bit that is set.

A buffer control method for a data storage device controller comprises receiving first channel data from a first channel having a first data format and second channel data from a second channel having a second data format and converting the first channel data and the second channel data to respective data packets each having a third data format that is different than the first data format and the second data format and selectively transmitting the data packets having the third data format to a memory in a single write burst.

In other features, the method further comprises receiving the data packets from the memory and converting the data packets to the first channel data having the first channel format and the second channel data having the second channel format. The method further comprises including a write data module that reformats the first channel format and the second channel format to the third data format. The method further comprises inserting byte parity into the data packets and verifying the byte parity.

In other features, the third data format includes a data packet length of two units or four units and includes data stored to the buffer beginning at an even address boundary of the memory. Each unit of the two units and the four units corresponds to a data qualifier strobe signal. The method further comprises storing a portion of each of the data packets until one of the first channel data and the second channel data is completely translated to the third data format and adapting to a size of one of said data packets. The method further comprises transferring one of the data packets to the memory when one of the first channel data and the second channel data is completely translated to the third data format. The method further comprises stopping transferring one of the data packets when an empty signal is detected.

In other features, the conversion of the data packets is based on at least one of a size of one of the data packets, an alignment of a first-in-first-out (FIFO) memory of one of the first channel and the second channel, an initial address of the memory, and a length of one of the data packets. The method further comprises performing delay alignment functions on data that is at least one of transmitted from the memory and transmitted to the memory. The delay alignment functions include delaying data qualifier signals based on digital locked loops.

In other features, the method further comprises receiving at least one of the data packets from the memory and converting the at least one of the data packets from a data qualifier signal domain to a memory control clock domain. The method further comprises performing duplicate error detection using at least one pair of capture flip-flops. The method further comprises inserting byte parity in at least one of the data packets. The method further comprises modifying an alignment and an address of at least one of the data packets.

In other features, the method further comprises controlling a tenure state. The tenure state includes one of an active state, a pause state, and an idle state. The method further comprises generating a decoded address signal based on an initial channel address of one of the first channel and the second channel. The method further comprises requesting at least one of refresh cycles and programmable refresh cycles using a distributed refresh technique based on information supplied by the internal interface.

In other features, the method further comprises executing a plurality of protocol operations of the memory. Each of the protocol operations include at least one of an activate command, a write command, a read command, a self refresh command, a buffer initialization command, a pre-charge command, and a digitally locked loop initialization command. The method further comprises entering a wait state before executing consecutive ones of the protocol commands. The method further comprises generating an adjustment time parameter that provides a counter for at least one of a new protocol command and a missing protocol command.

In other features, the method further comprises operating on a buffer control clock and the memory operating on a buffer clock, the buffer control clock operates at one of a rate of the buffer clock and double the rate of the buffer clock. The method further comprises monitoring the internal interface and granting access to one of the first channel and the second channel based on a channel request priority among the first and second channel. The single write burst writes the data packets to a location in the memory that begins at an even address of the memory. The method further comprises detecting an error when the data packets include padded data corresponding to a first mask bit that is reset and detecting an error when the data packets includes at least one of first channel data associated with a second mask bit that is set and second channel data associated with a third mask bit that is set.

A computer program stored for use by a processor for operating a buffer control system in a data storage device controller comprises receiving first channel data from a first channel having a first data format and second channel data from a second channel having a second data format and converting the first channel data and the second channel data to respective data packets each having a third data format that is different than the first data format and the second data format and selectively transmitting the data packets having the third data format to a memory in a single write burst.

In other features, the program further comprises receiving the data packets from the memory and converting the data packets to the first channel data having the first channel format and the second channel data having the second channel format. The program further comprises including a write data module that reformats the first channel format and the second channel format to the third data format. The program further comprises inserting byte parity into the data packets and verifying the byte parity.

In other features, the third data format includes a data packet length of two units or four units and includes data stored to the buffer beginning at an even address boundary of the memory. Each unit of the two units and the four units corresponds to a data qualifier strobe signal. The program further comprises storing a portion of each of the data packets until one of the first channel data and the second channel data is completely translated to the third data format and adapting to a size of one of said data packets. The program further comprises transferring one of the data packets to the memory when one of the first channel data and the second channel data is completely translated to the third data format. The program further comprises stopping transferring one of the data packets when an empty signal is detected.

In other features, the conversion of the data packets is based on at least one of a size of one of the data packets, an alignment of a first-in-first-out (FIFO) memory of one of the first channel and the second channel, an initial address of the memory, and a length of one of the data packets. The program further comprises performing delay alignment functions on data that is at least one of transmitted from the memory and transmitted to the memory. The delay alignment functions include delaying data qualifier signals based on digital locked loops.

In other features, the program further comprises receiving at least one of the data packets from the memory and converting the at least one of the data packets from a data qualifier signal domain to a memory control clock domain. The program further comprises performing duplicate error detection using at least one pair of capture flip-flops. The program further comprises inserting byte parity in at least one of the data packets. The program further comprises modifying an alignment and an address of at least one of the data packets.

In other features, the program further comprises controlling a tenure state. The tenure state includes one of an active state, a pause state, and an idle state. The program further comprises generating a decoded address signal based on an initial channel address of one of the first channel and the second channel. The program further comprises requesting at least one of refresh cycles and programmable refresh cycles using a distributed refresh technique based on information supplied by the internal interface.

In other features, the program further comprises executing a plurality of protocol operations of the memory. Each of the protocol operations include at least one of an activate command, a write command, a read command, a self refresh command, a buffer initialization command, a pre-charge command, and a digitally locked loop initialization command. The program further comprises entering a wait state before executing consecutive ones of the protocol commands. The program further comprises generating an adjustment time parameter that provides a counter for at least one of a new protocol command and a missing protocol command.

In other features, the program further comprises operating on a buffer control clock and the memory operating on a buffer clock, the buffer control clock operates at one of a rate of the buffer clock and double the rate of the buffer clock. The program further comprises monitoring the internal interface and granting access to one of the first channel and the second channel based on a channel request priority among the first and second channel. The single write burst writes the data packets to a location in the memory that begins at an even address of the memory. The program further comprises detecting an error when the data packets include padded data corresponding to a first mask bit that is reset and detecting an error when the data packets includes at least one of first channel data associated with a second mask bit that is set and second channel data associated with a third mask bit that is set.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a chart illustrating exemplary configurations of the DRC module according to the present disclosure;

FIG. 6A illustrates data translation according to the present disclosure;

FIG. 6B illustrates data translation according to the present disclosure;

FIG. 7A is a flow diagram illustrating steps of a method for processing channel data during a write operation according to the present disclosure;

FIG. 7B is a flow diagram illustrating steps of a method for processing channel data during the write operation according to the present disclosure;

FIG. 9C is a functional block diagram of a vehicle control system;

FIG. 9D is a functional block diagram of a cellular phone;

FIG. 9E is a functional block diagram of a set top box; and

FIG. 9 F is a functional block diagram of a media player.

DETAILED DESCRIPTION

Figure 1:
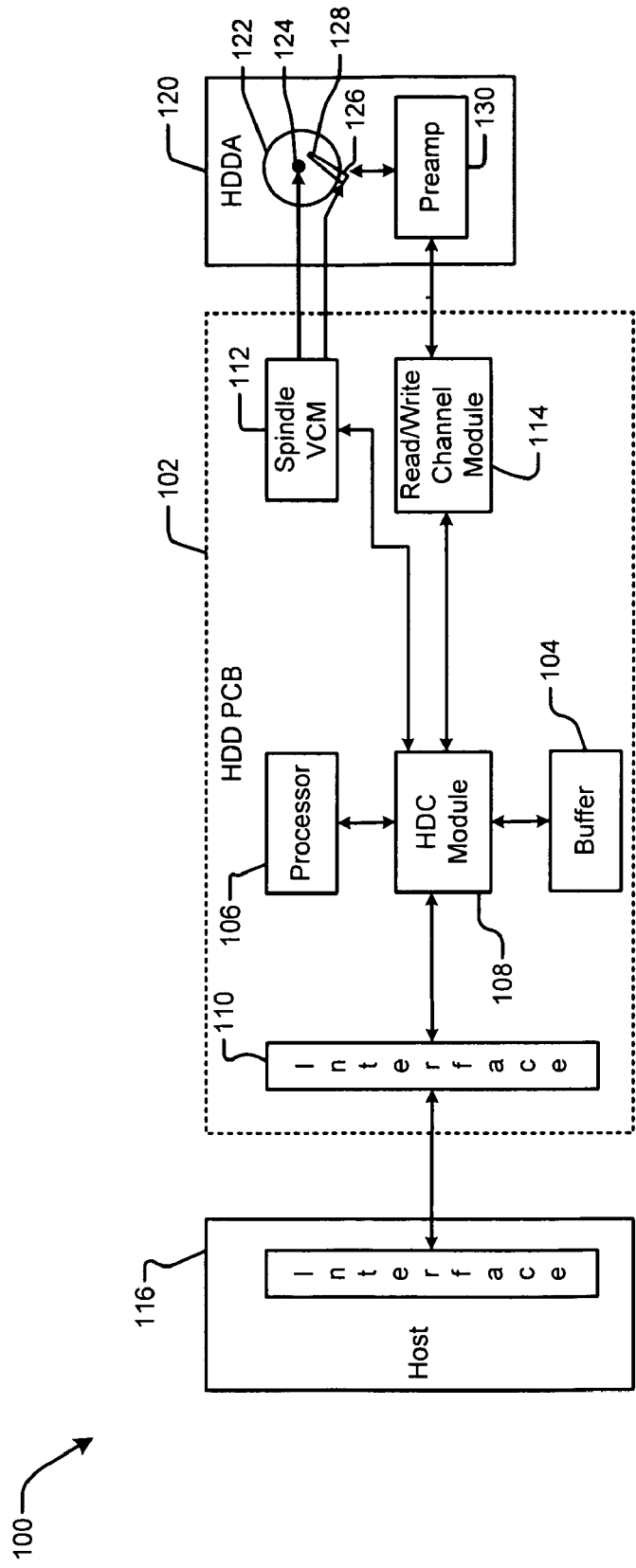
FIG. 1 is a functional block diagram of a hard disk drive (HDD) system according to the present disclosure.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

In conventional storage systems, dual data rate synchronous dynamic random access memory (DDR) controllers and synchronous dynamic random access memory (SDRAM) controllers that adapt to the various types of direct memory access (DMA) channel data requests of the storage system require complex architectures. The increased complexity of theses controllers results in a decrease in system performance (i.e. transmission rates). A DDR control (DRC) module according to the present disclosure enables the HDD system to have a maintainable design that can adapt to future DDR protocols and technologies. Additionally, the present disclosure provides an architecture that supports increased communication bandwidths and techniques for managing manufacturing and customer support issues relating to the HDD system.

Referring now to FIG. 1, an exemplary hard disk drive (HDD) system 100 that implements a buffer control system is shown to include a HDD printed circuit board (PCB) 102. A memory module such as buffer 104 stores read, write and/or volatile control data that is associated with the control of the HDD system 100. The buffer 104 usually employs volatile memory having low latency. The buffer 104 may include, but is not limited to, DDR and SDRAM. The present implementation contemplates a buffer that includes a DDR. Nonvolatile memory such as flash memory may also be provided to store critical data such as nonvolatile control code.

A processor 106 arranged on the HDD PCB 102 performs data and/or control processing that is related to the operation of the HDD system 100. A hard disk control (HDC) module 108 communicates with an input/output interface 110, with a spindle/voice coil motor (VCM) driver or module 112, and/or a read/write channel module 114. The HDC module 108 coordinates control of the spindle/VCM module 112, the read/write channel module 114, and the processor 106 and data input/output with a host 116 via the interface 110. The interface 110 processes frame-based information including, but not limited to, Serial Attached Small (SAS) Computer Interface frames and fiber channel frames received from the host 116. The interface 110 transmits frames received from the host 116 to the HDC 108.

A hard disk drive assembly (HDDA) 120 includes one or more hard drive platters 122 that include magnetic coatings that store magnetic fields. The platters 122 are rotated by a spindle motor that is schematically shown at 124. Generally the spindle motor 124 rotates the hard drive platters 122 at a controlled speed during the read/write operations. One or more read/write arms 126 move relative to the platters 122 to read and/or write data to/from the hard drive platters 122. The spindle/VCM module 112 controls the spindle motor 124, which rotates the platters 122. The spindle/VCM module 112 also generates control signals that position the read/write arm 126, for example using a voice coil actuator, a stepper motor or any other suitable actuator.

During write operations, the read/write channel module 114 encodes the data to be written with a read/write device 128. The read/write channel module 114 processes the write signal for reliability and may apply, for example, error correction coding (ECC), run length limited coding (RLL), and the like. During read operations, the read/write channel module 114 converts an analog read signal output of the read/write device 128 to a digital read signal. The converted signal is then detected and decoded by known techniques to recover the data that was written on the platters 122.

The read/write device 128 is located near a distal end of the read/write arm 126. The read/write device 128 includes a write element such as an inductor that generates a magnetic field. The read/write device 128 also includes a read element (such as a magneto-resistive (MR) element) that senses the magnetic field on the platters 122. The HDDA 120 includes a preamplifier circuit or module 130 that amplifies the analog read/write signals. When reading data, the preamplifier module 130 amplifies low level signals from the read element and outputs the amplified signal to the read/write channel module 114. While writing data, a write current is generated that flows through the write element of the read/write device 128. The write current is switched to produce a magnetic field having a positive or negative polarity. The positive or negative polarity is stored by the hard drive platters 122 and is used to represent data.

The data is stored on the platters 122 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, the processor 106 and the HDC module 108 may be implemented by a single chip. The spindle/VCM module 112 and/or the read/write channel module 114 may also be implemented by the same chip as the processor 106, the HDC module 108 and/or by additional chips. Alternatively, most of the HDD system 100 other than the HDDA 120 may be implemented as a system on chip (SOC).

Figure 2:
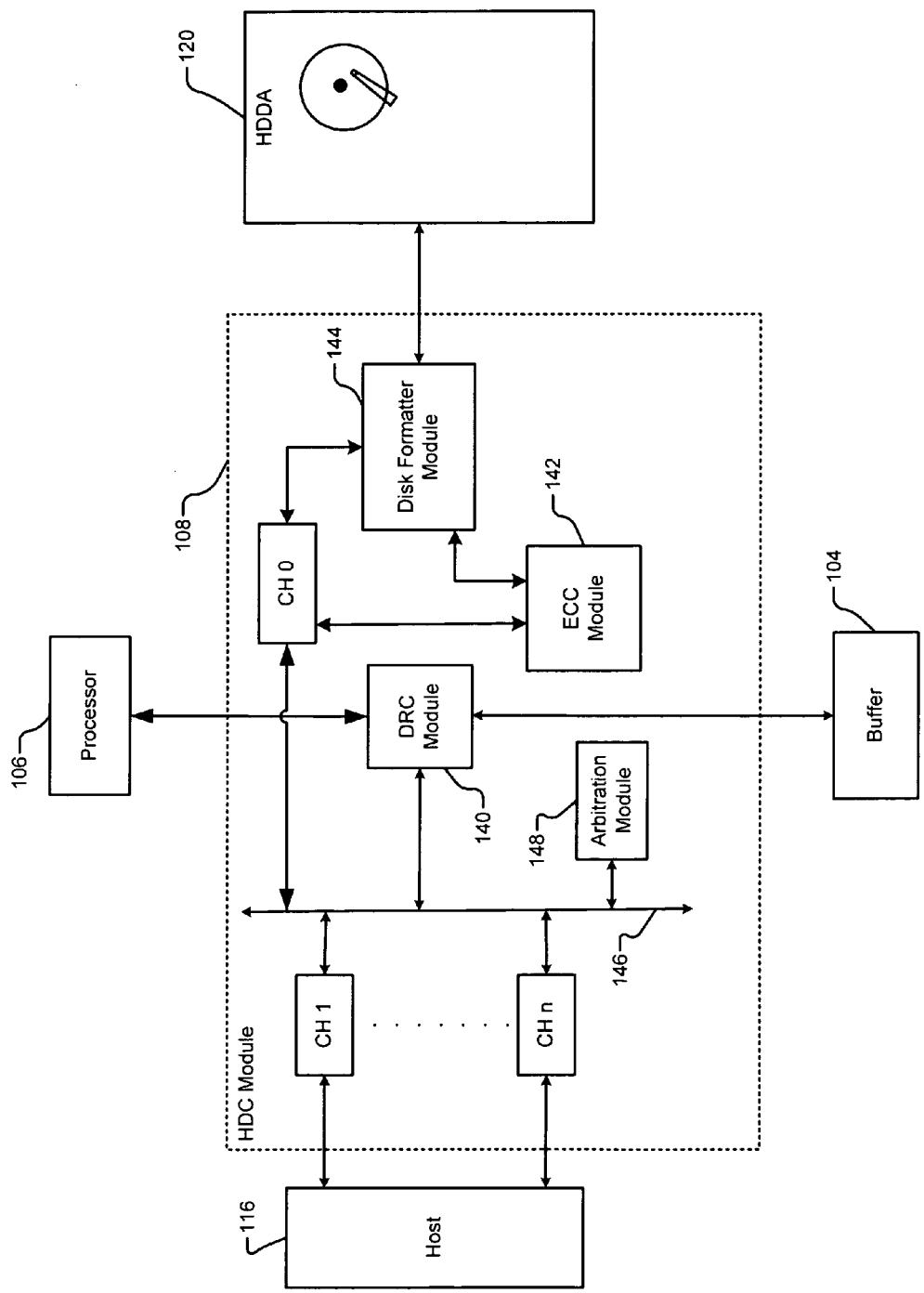
FIG. 2 is a functional block diagram of a hard disk control (HDC) module according to the present disclosure.

Referring now to FIG. 2, the HDC module 108 is shown in more detail. The HDC module 108 implements the buffer control system. The HDC module 108 communicates with the buffer 104, the processor 106, the host 116, and the HDDA 120 as described in FIG. 1. The HDC module 108 includes a DDR control (DRC) module 140, an ECC module 142, a disk formatter module 144, and an arbitration module 148.

The DRC module 140 (e.g. a direct memory access (DMA) controller) connects the buffer 104 to the disk formatter module 144, the ECC module 142, the arbitration module 148, the host 116, the processor 106, and the HDDA 120. The DRC module 140 controls data movement between the host 116 and the buffer 104. Also, the DRC module 140 supports additional channels (not shown). The additional channels enable the processor 106 to communicate with the buffer 104 and/or support the execution of algorithms involving the buffer 104.

The host 116 sends read and write commands to the HDC module 108. The HDC module 108 stores the read and write commands in the buffer 104. The processor 106 receives the read and write commands from the buffer 104 and executes firmware to control the HDC module 108 accordingly. During read operations, the HDC module 108 reads data corresponding to the read commands from the HDDA 120. The DMA channel (CH) 0 and the ECC module 142 receive the data from the HDDA 120. The CH 0 stores the data while the ECC module 142 calculates error correction requirements based on the data. The ECC module 142 generates an ECC mask for errors that may have occurred during read operations and transmits the ECC mask to the CH 0. The data is corrected while the data is stored in the CH 0. After any errors in the data are corrected, the data is transferred to the buffer 104 via the DRC module 140. The data is then transferred from the buffer 104 to the host 116.

During write operations and read operations, the DRC module 140 implements the buffer control system. The DRC module 140 controls data and/or information communicated from the host 116 to the buffer 104 and/or communicated from the buffer 104 to the host 116. For example, the DRC module 140 responds to data transfer requests of DMA channel (CH) 1, . . . , and DMA CH n, by executing requested DDR writes and reads. The DMA channels communicate with the DRC module 140 via a DRC internal interface (DRC I/F) 146. The DRC I/F can include, but is not limited to, a 64 bit wide interface and a 128 bit wide interface. The DRC module 140 supports a plurality of internal I/F widths.

The DRC module 146 manages protocols and performs non-data transfer functions including, but not limited to, buffer initialization, buffer power-savings mode, and/or refresh cycles. Data is stored to the buffer 104 via the DRC module 140. In various embodiments, an existing integrated circuit and/or additional integrated circuits may implement the DRC module 140. Alternatively, the DRC module 140 may be implemented as a SOC.

The arbitration module 148 monitors the DRC I/F 146 and grants the DMA channels access to the buffer 104 based on a priority of a data transfer request among the DMA channels. A DMA channel having a data transfer request with the highest priority receives access time, referred to as bus tenure, to the buffer 104 until the DMA channel completes the data transfer. Upon completion of the data transfer, another channel having a transfer request, if present, is similarly granted tenure to the buffer 104 based on the resulting priority. The DRC module 140 minimizes the time between tenures.

During write operations, the disk formatter module 144 controls writing of data to the HDDA 120. The buffer 104 receives data corresponding to the write commands via the HDC module 108. The disk formatter module 144 receives the data from the buffer 104 via the HDC module 108. More specifically, the CH 0 receives the data from the DRC module 140 and transmits the data to the disk formatter module 144 and the ECC module 142. The disk formatter module 144 formats the data for writing to the HDDA 120, while the ECC module 142 generates the ECC. The disk formatter module 144, monitors a position of the read/write heads, and writes the data received from the CH 0 to the read/write heads as described in FIG. 1. The disk formatter then writes the error correction codes to the read/write heads upon completion of a sector.

Figure 3:
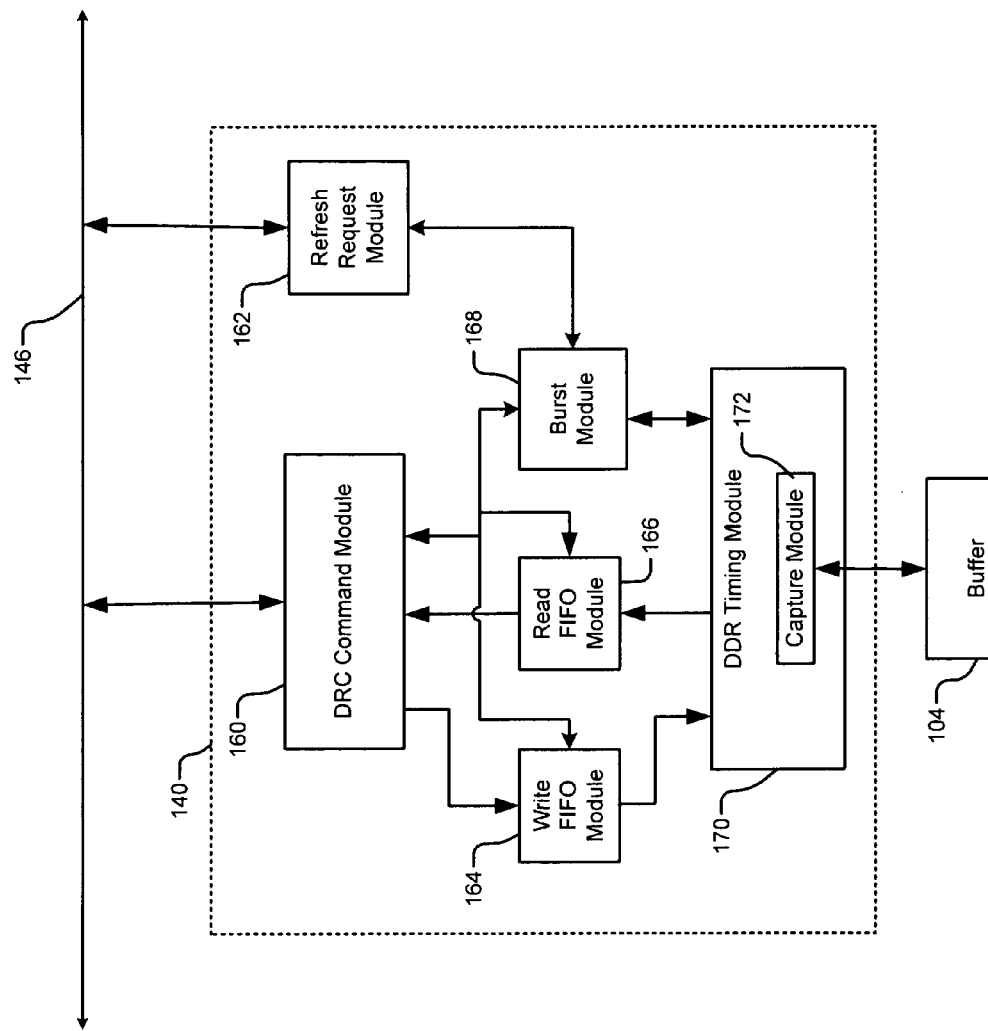
FIG. 3 is a functional block diagram of a dual data rate synchronous dynamic random access memory (DDR) control (DRC) module according to the present disclosure.

Referring now to FIG. 3, the DRC module 140 and the buffer 104 are shown in more detail. The DRC module 140 includes a DRC command module 160, a refresh request module 162, a write first-in-first-out (FIFO) module 164, a read FIFO module 166, a DDR burst module 168, and a DDR timing module 170. As noted previously, the DRC module 140 processes data transfer requests from the DMA channels by executing writes and reads to and from the buffer 104, respectively. The DRC module 140 may be used in various configurations by varying attributes of the system 300. Variable attributes of the DRC module 140 may include, but are not limited to, data width of the DRC I/F 146 data width, a clock ratio between the DRC module 140 clock (BCCLK) and the buffer 104 clock (BUFCLK), the burst length, and the data bus width of the buffer 104. The width of the DRC I/F 146 and the buffer 104 data bus are measured in bits. The width of the burst length is measured in beats. In the present implementation, DRC module 140 transmits 2 beats per BCCLK.

FIG. 4 illustrates exemplary configurations that are generated by varying the attributes of the DRC module 140. For example, configuration 1 includes a DRC I/F width of 64 bits, a clock ratio of 1, a burst length of 2 beats, and a buffer data bus width of 32 bits.

Figure 5:
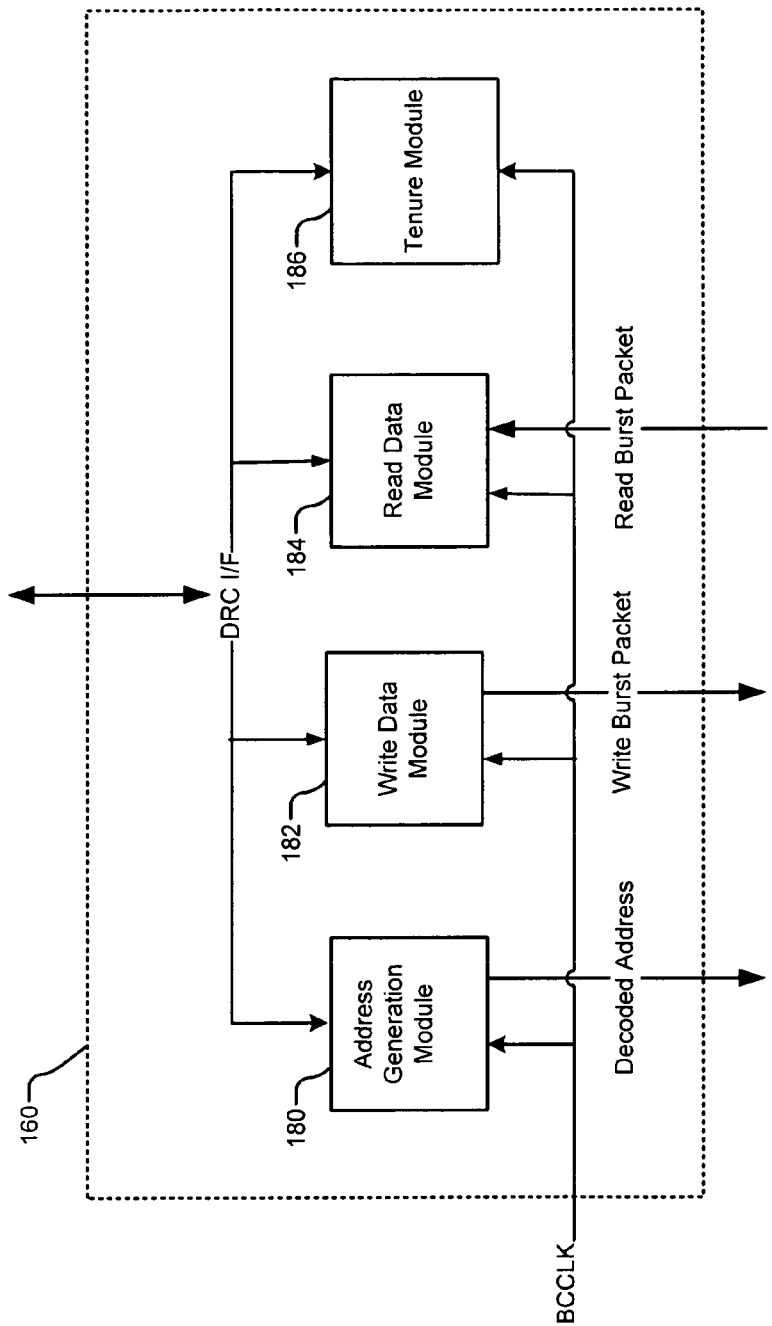
FIG. 5 is a functional block diagram of a DRC command module according to the present disclosure.

Referring now to FIGS. 3 and 5, the DRC command module 160 is shown in more detail. The DRC command module 160 includes an address generation module 180, a write data module 182, a read data module 184, and a tenure module 186 that operate on the BCCLK. The tenure module 186 monitors a tenure state of a current tenure of access to the buffer 104. The tenure states of a DMA channel can include an active burst state, a pause state, and an idle state. The tenure module 186 controls the write and read operations in the write data module 182 and read data module 184, respectively, and synchronizes the modules within the DRC module 140.

The address generation module 180 obtains an initial channel address from an active DMA channel when the tenure module 186 signals a read or write operation. The address generation module 180 processes the initial channel address and provides a decoded address signal to the burst module 168 and the DDR timing module 170. The burst module 168 uses the decoded address for read and write operations.

The write data module 182 and the read data module 184 manage data attributes including, but not limited to, internal data alignment, data transfer size, and address alignment. During write operations, the data transmitted from the channels to the DRC module 140 include various data formats. The write data module 182 reformats the data received from each of the DMA channels into burst packets that are transmitted to the burst module 168. The write data module 182 masks data not to be written to the buffer 104. Typically, the burst packets include 64 and/or 128 bits of data. The burst packet size corresponds to a programmed burst length. In other words, data received from each of the DMA channels having various formats are all translated into burst packets having a single format.

Conventionally, DDR controllers adapted to the channel data transfer requests resulting in the need for complex controller architectures. In the present implementation, the DRC command module 160 uses a single burst format for write and read operations. During a write or read operation, the DRC command module 160 processes a predetermined amount of data required for the present write or read operation. During write commands, the write data module 182 generates a burst packet, also referred to as a whole even burst, from the data packets received from the channels. The length of the whole even burst is specified when the DRC module 140 initializes the DDR.

Whole even bursts include even multiples of 4 bytes. In an exemplary embodiment, a whole even burst can include, but is not limited to, 64 or 128 bits of data. The whole even bursts are written to the buffer 104 by the burst module 168 when the entire whole even burst has been generated by the DRC command module 160. While the burst module 168 is writing a whole even burst to the buffer 104 via a single write burst command, the write data module 182 simultaneously generates another whole even burst, thereby increasing the efficiency of the data transfer.

Burst lengths can include, but are not limited to, two or four beats. One beat corresponds to one data qualifier strobe (DQS) edge. A write or read command begins at an even address boundary within the buffer 104. For example, an address sequence for a write command that has a burst length of four can include addresses 0, 1, 2, and 3. Generally, access to information contained within a whole even burst begins at the 0 address. However, if address 0 of the buffer 104 is not to be written to by the write data module 182, then the beat corresponding to address 0 will be masked by the write data module 182. Each beat of a whole even burst includes a mask bit that is set or reset. In the previous example, the write data module 182 sets the mask bit of the beat in order mask the beat. The write data module 182 also inserts padded data (zero value data) in the beat when the mask bit is set. If the mask bit of a beat of a whole even burst is reset, the write data module 182 generates the beat with channel data received from an active DMA channel. Additionally, the write data module 182 supplements the channel data with byte parity as the data is captured from the active DMA channel.

During a write operation, the write data module 182 temporarily stores portions (e.g. less than a complete burst whole even burst) of a whole even burst to the write FIFO module 164 that is generally located between the DRC command module 160 and the burst module 168. The write data module 182 continues to generate and store a whole even burst to the write FIFO module 164 as long as the write FIFO module 164 remains below maximum capacity and the active DMA channel continues to request a data transfer.

The write FIFO module 164 stores portions of the whole even burst until the whole even burst is completely generated and ready to be written to the buffer 104. The size of the write FIFO module 164 automatically adapts to accommodate the burst packet generated by the DRC command module 160. The write FIFO module 164 generates an empty signal indicating that the burst module 168 has completed transferring a burst packet to the buffer 104 and no data remains in the write FIFO module 164. The burst module 168 continues storing the burst packet to the buffer 104 via the DDR timing module 170 until the burst module 168 detects the empty signal. For example, the DDR timing module 170 verifies that the burst packet and a corresponding DQS signal maintain a valid timing relationship. Additionally, the DDR timing module 170 performs a parity check of each beat, including the mask bit, of a whole even burst. For example, if a beat includes padded data with a corresponding mask bit reset or channel data with a corresponding mask bit set, the DDR timing module will generate a parity error.

The DDR timing module 170 manages the interface timing with the buffer 104. The buffer 104 writes a beat if the corresponding mask bit is reset. In contrast, the buffer module does not write a beat if the corresponding mask bit is set. In other words, when the mask bit is reset, the buffer 104 stores data based channel data received from an active DMA channel. If the mask bit is set, the buffer module 104 does not store the padded data.

During a read operation, the burst module 168 executes single whole even burst read commands. The read data module 184 reads data from the read FIFO module 166 and transforms the data into a format requested by an active DMA channel. The burst module 168 transmits a read strobe signal to the read data module 184 indicating when to read the read FIFO module 166. The read strobe signal is delayed based on column address strobe (CAS) latency and the depth of read FIFO module 166.

Prior to being transmitted to the read FIFO module 166, the data transmitted from the buffer 104 is captured at a capture module 172 (e.g. captured using a first bank of capture flip-flops). The capture module 172 performs duplicate error detection (e.g. between a first bank of flip flops and a second bank of flip-flops). By duplicating the captured data, the DRC command module 160 can detect problems at the initial capture, thereby avoiding errors from being carried through to an active DMA channel, resulting in CRC errors. Errors can include, but are not limited to, deteriorated signal quality and alignment errors. The capture module 172 also and inserts byte parity into a burst packet transmitted through to read data module 184. The read data module 184 checks the byte parity as the burst packet is transmitted to the active DMA channel.

The read data module 184 modifies the data address and data alignment received from the read FIFO module 166 to build the burst packets. If the DMA channel does not require a particular portion of the burst packet, the read data module 184 discards the unwanted portion of the burst packet. Additionally, the read data module 184 verifies the byte parity when it receives a burst packet and sets the single error detection bit if an error is detected within the received burst packet.

The format of the read FIFO module 166 is based on the external buffer 104 bus width (e.g. 16 or 32 bits). The read data module 184 divides data read from the read FIFO module 166 per DQS signal. The buffer 104 sources the DQS signal on reads. The DQS clock (not shown) is not synchronous to the BUFCLK due in part to timing skew (e.g. 1 nanosecond) generated at the buffer 104. Additional delay may result from the transmission of the DQS clock from the buffer 104 to the capture module 172. The read FIFO module 166 converts the read data from the DQS domain to the BCCLK domain. In the present implementation, the BUFCLK can operate at one time or two times the frequency of the BCCLK. However, various operating ratios that are edge aligned are contemplated.

Referring back to FIG. 3, the burst module 168 executes protocols of the buffer 104. The burst module 168 interfaces with the DRC command module 160 and the timing module 170. The burst module 168 may execute a combination of commands for each high speed operation of the system 100. The operations include, but are not limited to, a DDL initialization operation, a buffer initialization operation, a manual buffer command operation, a self refresh/power down mode operation, a refresh operation, a write burst operation, and a read operation. The commands include, but are not limited to, an activate command, a write burst command, a read burst command, a refresh command, a self refresh command, a buffer initialization command, a pre-charge command, and a digitally locked loop (DLL) initialization command. The burst module 168 executes every operation independently, and each operation remains active until completion. The burst module 168 returns to an idle state after the execution of an operation and prior to initiating another operation. A controllable wait state is observed between two consecutive commands.

The buffer initialization operation, the self refresh operation, and the DLL initialization operation use a generic alternating current (AC) timing value. However, the write burst operation, read burst operation, and refresh operation use industry standard AC timing parameters. Generally, AC timing parameters represent counters that include the minimum number of BUFCLK cycles that must expire between various commands. In the present implementation, the commands are categorized into groups including, but not limited to, data access commands and initialization commands. Data access commands require a minimal expenditure of the BUFCLK cycles. The performance of the DRC module 140 is tightly associated with the efficiency of the data access commands. Initialization commands share a single initialization timer. In the present implementation, the initialization timer is programmed to exceed typical operating requirements of the DRC module 140 thereby enabling the initialization timings to be compatible with future DRC architectures. Additionally, a predetermined adjust time parameter is used to cover any new or missing AC timing requirements. The adjust time parameter is added to every AC timing counter value.

The timing module 170 processes data to and/or from the buffer 104. The timing module 170 performs buffer delay alignments functions independently of buffer access functions. The timing module 170 is synchronous to the BUFCLK. The timing module 170 provides a precise delay of DQS signals based on DLL technology and delays all other signals based on place and route constraints.

The refresh request module 162 operates synchronously with the BCCLK. The refresh request module 162 requests refresh cycles based on information supplied by the DRC I/F 146. The number of refreshes per refresh cycle can be programmed in order to accommodate, for example, lengthy burst packets that require multiple refresh requests in a single tenure. In the present implementation, a distributed refresh technique is used to minimize refresh periods during an arbitration turn of a set of the DMA channels. As a result, the efficiency of the buffer 104 is enhanced.

FIGS. 6A and 6B illustrate translations of data between a DMA channel format and the buffer 104 format. The data translations in FIGS. 6 and 6B apply to write operations and read operations. Referring to FIG. 6A, the channel FIFO 500-1 includes double words DW-1, . . . , and DW-8 that are stored at internal byte addresses AD00, AD04, AD08, AD0c, AD10, AD14, AD18, and AD1c, respectively. Each double word includes 32 bits of data. Burst 1 includes the double words DW1, . . . , and DW4, stored in the buffer 104 at column addresses CA0, CA1, CA2, and CA3, respectively. Burst 2 includes double words DW5, . . . , and DW8, stored in the buffer 104 at column addresses CA4, CA5, CA6, and CA7.

Referring to FIG. 6B, the channel FIFO 500-2 includes double words DW-1, . . . , and DW-6 that are stored at internal byte addresses AD04, AD08, AD0c, AD10, AD14, and AD18, respectively. Internal byte addresses AD00 and AD1c are masked. In other words, internal byte addresses store padded data. Burst 1 includes the double words DW1, . . . , and DW3, stored in the buffer 104 at column addresses CA1, CA2, and CA3, respectively. Burst 2 includes double words DW4, . . . , and DW6, stored in the buffer 104 at column addresses CA4, CA5, and CA6. Column addresses CA0 and CA7 are masked.

Beats 1 through 4 represent clock edges during which data is translated from each of the channel FIFOs 500-1 and 500-2 to the buffer 104. For example, DW1 is translated from the internal byte address AD00 of the channel FIFO 500-1 to column address CA 0 of the buffer 104 on beat 1 (e.g., a rising edge of a first clock cycle) of burst 1. DW2 is translated from the internal byte address AD04 to the column address CA1 on beat 2 of burst 1 (e.g. a first falling edge of the first clock cycle). In the present implementation, data translations, reads, and/or writes occur solely in whole even bursts. The nature of data translations is based on factors including, but not limited to, the burst packet size, the channel FIFO alignment, the initial address of the buffer 104, and the transfer length of a burst.

FIG. 6A depicts a translation of an even burst of channel data to an even whole even burst transmitted to the buffer 104. The even burst of channel data requires no masking of beats therefore channel data is present in beat 1. FIG. 6B depicts a translation starting from an odd internal byte address of channel FIFO 500-2 to an odd column address of the buffer 104. Beat 1 of burst 1 and beat 4 of burst 2 require masking.

Referring now to FIG. 7A, a method 700 for processing channel data by the write data module 182 during a write operation is shown in more detail. The method 700 begins in step 702. In step 704, the tenure module 186 determines whether a write command has been given tenure (write tenure). If the write tenure is not active, the method 700 returns to step 704. If the write tenure is active, the method 700 proceeds to step 706. In step 706, each of the channels formats the alignment requirements of the respective DMA channel. For example, alignment requirements can include address alignment and the alignment of the channel FIFO of the respective DMA channels.

In step 708, the DRC command module 160 translates the channel data from a channel format to a whole even burst packet irrespective of the channel format requested by the data transfer request. In step 710, the write data module 182 determines if the write FIFO module 164 has reached capacity. If the write FIFO module 164 has reached capacity, the method 700 returns to step 710. If the write FIFO module 164 has not reached capacity, the method 700 proceeds to step 712.

In step 712, the write data module 182 temporarily stores portions of the burst packet to the write FIFO module 164. In step 714, the tenure module 186 determines whether the write tenure is complete. If the, tenure of the write command is not complete, the method 700 returns to step 708. If the tenure of the write command is complete, the method 700 proceeds to step 716. The method 700 ends in step 716.

Referring now to FIG. 7B, a method 750 for processing burst packets by the burst module 168 during a write operation is shown in more detail. The method 750 begins in step 752. In step 754, the tenure module 186 determines whether a write command has been given tenure. If the write tenure is not active, the method 750 returns to step 754. If the write tenure is active, the method 750 proceeds to step 756. In step 756, a page of the buffer 104 is activated.

In step 758, the burst module 168 determines if the write FIFO module 164 is empty. If the write FIFO module 164 is empty, the method 750 returns to step 758. If the write FIFO module 164 is not empty, the method 750 proceeds to step 760. In step 760, the burst module 168 writes to the buffer 104. In step 762, the tenure module 186 determines whether the write tenure is complete. If the, write tenure is not complete, the method 750 returns to step 758. If the tenure of the write command is complete, the method 750 proceeds to step 764. In step 764, the burst module 168 issues a precharge command. The method 750 ends in step 766.

Figure 8A:
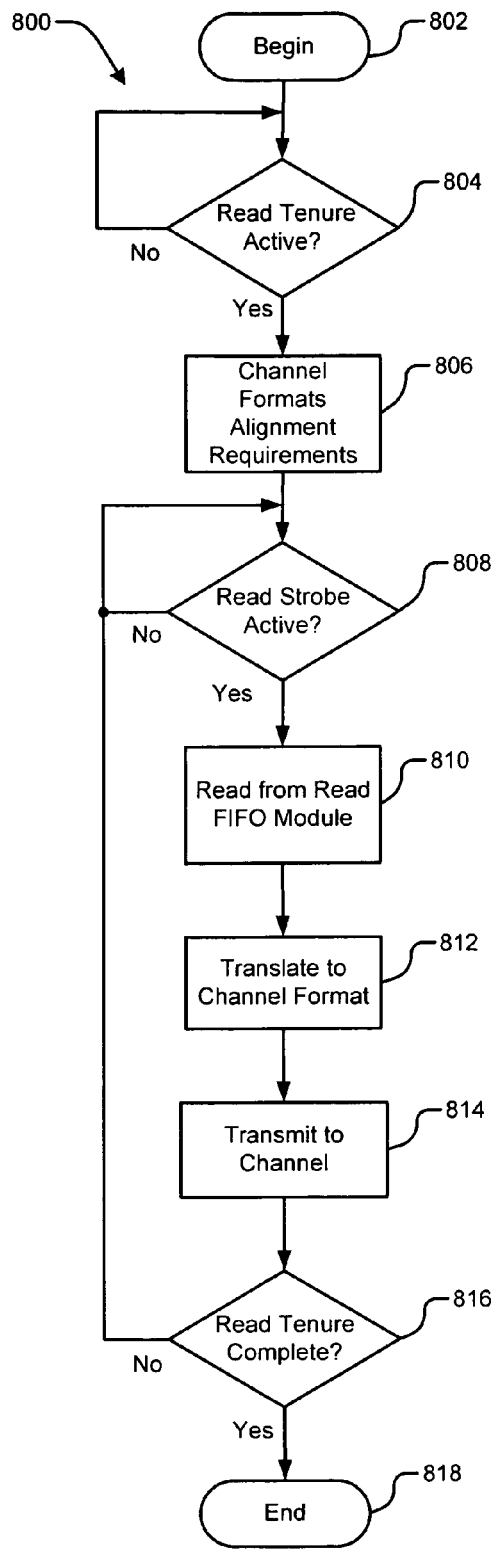
FIG. 8A is a flow diagram illustrating steps of a method for processing data from a buffer during a read operation according to the present disclosure.

Referring now to FIG. 8A, a method 800 for processing channel data by the read data module 184 during a read operation is shown in more detail. The method 800 begins in step 802. In step 804, the tenure module 186 determines whether a read command has been given tenure (read tenure). If the read tenure is not active, the method 800 returns to step 804. If the read tenure is active, the method 800 proceeds to step 806. In step 806, each of the DMA channels formats the alignment requirements of the respective DMA channel. In step 806, read data module 184 determines a read strobe is active. if the read strobe is not active, the method 800 returns to step 806. If the read strobe is active, the method 800 proceeds to step 810.

In step 810, the read data module 184 reads a burst packet from the read FIFO module 166. In step 812, the read data module 184 translates the burst packet into a channel format requested by the data transfer request. In step 814, the read data module 184 transmits the translated burst packet to the host 116 via the channel. In step 816, the tenure module 186 determines whether the read tenure is complete. If the read tenure is not complete, the method 800 returns to step 808. If the read tenure is active, the method 800 proceeds to step 818. The method 800 ends in step 818

Figure 8B:
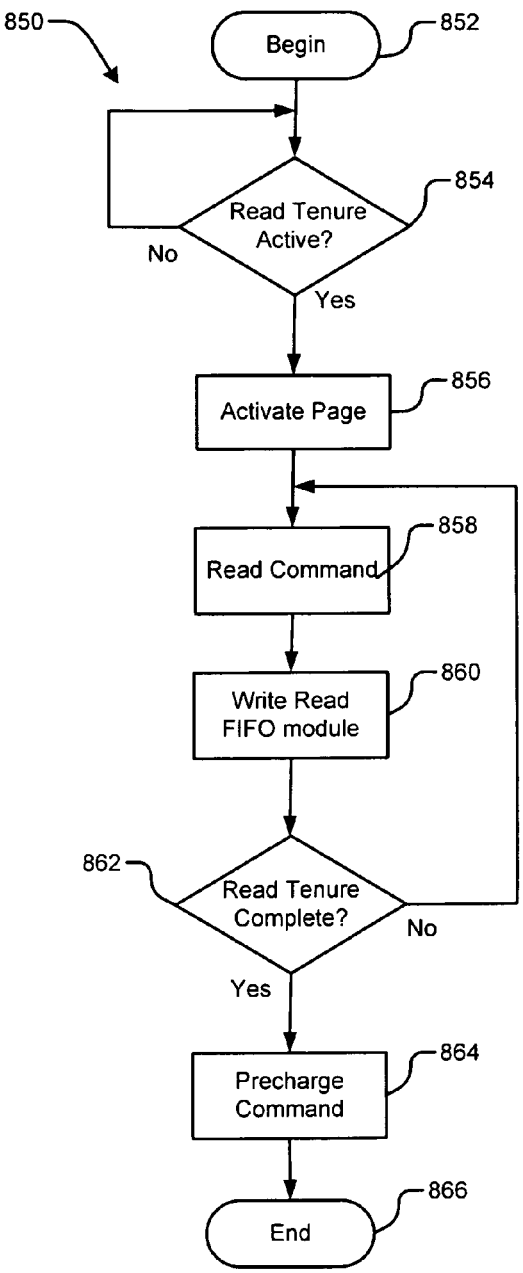
FIG. 8B is a flow diagram illustrating steps of a method for processing data from a buffer during a read operation according to the present disclosure.

Referring now to FIG. 8B, a method 850 for processing burst packets by the burst module 168 during a read operation is shown in more detail. The method 850 begins in step 852. In step 854, the tenure module 186 determines whether a read tenure is active. If the read tenure is not active, the method 850 returns to step 854. If the read tenure is active, the method 850 proceeds to step 856. In step 856, the burst module 168 activates a page of the buffer 104. In step 858, the burst module 168 issues a read command. In step 860, the burst module 168 writes the burst packet to the read FIFO module 166.

In step 862, the tenure module 186 determines whether the read tenure is complete. If the, read tenure is not complete, the method 850 returns to step 858. If the read tenure is complete, the method 850 proceeds to step 864. In step 864, the burst module 168 issues a precharge command. The method 850 ends in step 866.

Figures 9A, 9B:
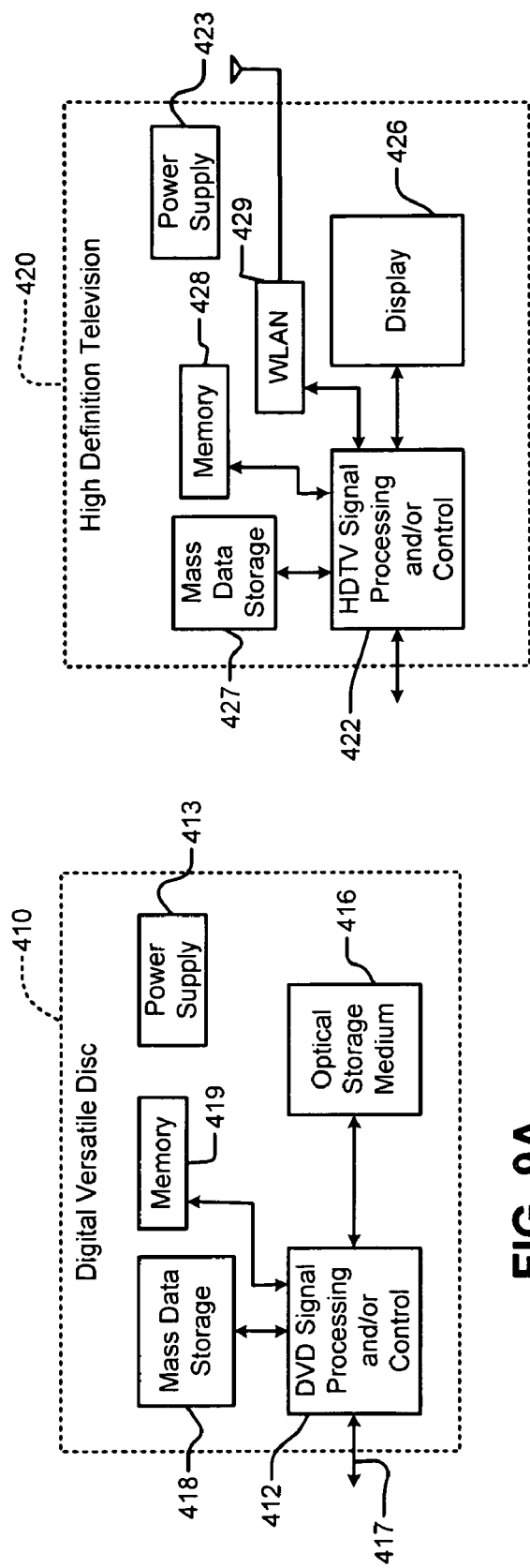
FIG. 9A is a functional block diagram of a digital versatile disk (DVD)
FIG. 9B is a functional block diagram of a high definition television.

Referring now to FIGS. 9A-9F, various exemplary implementations of the buffer control system are shown. As shown in FIG. 9A, the buffer control system can be implemented in a mass data storage of a digital versatile disc (DVD) drive 410. The DVD drive 410 includes either or both signal processing and/or control circuit, which are generally identified in FIG. 9A at 412, mass data storage 418 and/or a power supply 413. The mass data storage 418 may implement the buffer control system. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 1. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Referring now to FIG. 9B, the buffer control system can be implemented in a mass data storage of a high definition television (HDTV) 420. The HDTV 420 includes either or both signal processing and/or control circuit, which are generally identified in FIG. 9B at 422, a WLAN interface 429, mass data storage 427 and/or a power supply 423. The mass data storage 427 implements the buffer control system. For example, the mass data storage 427 may include one or more buffer memories that temporarily store data that is transmitted to and from the HDTV 420. The memory controller module that manages the buffer memories may implement the buffer control system. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices including DIVD drives and HDDs. At least one HDD may have the configuration shown in FIG. 1 and/or at least one DVD drive may have the configuration shown in FIG. 10A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via the WLAN network interface 429.

Referring now to FIG. 9C, the vehicle 430 includes a powertrain control system 432, a WLAN interface 448, mass data storage 446 and/or a power supply 433. The mass data storage 446 (e.g. an HDD) implements the buffer control system. For example, the mass data storage 446 may include one or more buffer memories that temporarily store data that is transmitted to and from the powertrain control system 432. The memory controller module that manages the buffer memories may implement the buffer control system. In some implementations, the powertrain control system 432 receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The buffer control system may also be implemented in other control system 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc system and the like. Still other implementations are contemplated.

The powertrain control system 432 may communicate with mass data storage 446 that stores data in a nonvolatile manner. The mass data storage 446 may include optical and/or magnetic storage devices such as hard disk drives (HDDs) and/or DVD drives. At least one HDD may have the configuration shown in FIG. 1 and/or at least one DVD drive may have the configuration shown in FIG. 9A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via the WLAN interface 448. The control system 440 may also include mass data storage, memory and/or a WLAN interface (all not shown).

Referring now to FIG. 9D, the buffer control system can be implemented in a mass data storage of a cellular phone 450 that may include a cellular antenna 451. The cellular phone 450 includes either or both signal processing and/or control circuit, which are generally identified in FIG. 9D at 452, a WLAN interface 468, mass data storage 464 and/or a power supply 453. The mass data storage 464 (e.g. an HDD) of the cellular phone 450 may implement the buffer control system. For example, the mass data storage 464 may include one or more buffer memories that temporarily store data that is transmitted to and from the cellular phone 450. The memory controller module that manages the buffer memories may implement the buffer control system. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuit 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices including hard disk drives (HDDs) and/or DVD drives. At least one HDD may have the configuration shown in FIG. 1 and/or at least one DVD drive may have the configuration shown in FIG. 9A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via the WLAN interface 468.

Referring now to FIG. 9E, the buffer control system can be implemented in a mass data storage of a set top box 480. The set top box 480 includes either or both signal processing and/or control circuit, which are generally identified in FIG. 9E at 484, a WLAN interface 496, mass data storage 490 and/or a power supply 483. The mass data storage 490 of the set top box 480 may implement the buffer control system. For example, the mass data storage 490 may include one or more buffer memories that temporarily store data that is transmitted to and from the set top box 480. The memory controller module that manages the buffer memories may implement the buffer control system. The set top box 480 receives signals from a source such as a broadband source and outputs standard and/or high definition audio/video signals suitable for a display 488 such as a television, a monitor and/or other video and/or audio output devices. The signal processing and/or control circuit 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as hard disk drives (HDDs) and/or DVD drives. At least one HDD may have the configuration shown in FIG. 1 and/or at least one DVD drive may have the configuration shown in FIG. 9A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via the WLAN interface 496.

Referring now to FIG. 9F, the buffer control system can be implemented in a mass data storage of a media player 500. The media player 500 includes either or both signal processing and/or control circuit, which are generally identified in FIG. 9F at 504, a WLAN interface 516, mass data storage 510 and/or a power supply 513. The mass data storage 510 (e.g. an HDD) of the media player 500 may implement the buffer control system. For example, the mass data storage 510 may include one or more buffer memories that temporarily store data that is transmitted to and from the media player 500. The memory controller module that manages the buffer memories may implement the buffer control system. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuit 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices such as hard disk drives (HDDs) and/or DVD drives. At least one HDD may have the configuration shown in FIG. 1 and/or at least one DVD drive may have the configuration shown in FIG. 9A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via the WLAN interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A buffer control system for a hard disk drive (HDD), the buffer control system comprising:
    a buffer memory configured to store data being transferred between a first host and the HDD;
    a command module configured to
        receive first channel data from a first direct memory access (DMA) channel of the first host, the first channel data having a first data format,
        receive second channel data from a second DMA channel of the first host, the second channel data having a second data format, wherein the first channel data and the second channel data correspond to the data being transferred between the first host and the HDD, and wherein the first data format and the second data format are different data formats, and
        convert the first channel data and the second channel data to respective data packets, each of the data packets having a same third data format that is different than each of the first data format and the second data format, the third format being associated with the buffer memory; and
    a burst module to selectively transmit the data packets having the third data format to the buffer memory in a single write burst.

2. The system of claim 1, wherein the command module receives the data packets from the buffer memory and converts each of the data packets to at least one of (i) the first channel data having the first data format and (ii) the second channel data having the second data format.

3. The system of claim 2, wherein the third data format includes a data packet length of two units or four units and includes data stored to the buffer memory beginning at an even address boundary of the buffer memory, wherein each unit of the two units and the four units corresponds to a data qualifier strobe signal.

4. The system of claim 2, wherein the conversion of the data packets is based on at least one of a size of one of the data packets, an alignment of a first-in-first-out (FIFO) memory of one of the first DMA channel and the second DMA channel, an initial address of the buffer memory, and a length of one of the data packets.

5. The system of claim 2, further comprising a timing module to perform delay alignment functions on data that is at least one of transmitted from the buffer memory and transmitted to the buffer memory, wherein the timing module performs delays of data qualifier signals based on digital locked loops.

6. The system of claim 2, further comprising a read FIFO module to receive at least one of the data packets from the buffer memory and to convert the at least one of the data packets from a data qualifier signal domain to a memory control clock domain.

7. The system of claim 6, further comprising at least one pair of capture flip-flops that perform duplicate error detection.

8. The system of claim 6, further comprising a capture module to insert byte parity in at least one of the data packets.

9. The system of claim 6, wherein the command module includes a read data module to modify an alignment and an address of at least one of the data packets received from the read FIFO module.

10. The system of claim 2, wherein the command module includes a tenure module to control a tenure state within at least one of the command module and the burst module, wherein the tenure state includes one of an active state, a pause state, and an idle state.

11. The system of claim 10, wherein the command module includes an address generation module to generate a decoded address signal based on an initial channel address of one of the first DMA channel and the second DMA channel.

12. The system of claim 2, wherein the burst module executes a plurality of protocol commands of the buffer memory, wherein each of the protocol commands include at least one of an activate command, a write command, a read command, a self refresh command, a buffer initialization command, a pre-charge command, and a digitally locked loop initialization command.

13. The system of claim 12, wherein the burst module enters a wait state before executing consecutive ones of the protocol commands.

14. The system of claim 12, wherein the burst module generates an adjustment time parameter that provides a counter for at least one of a new protocol command and a missing protocol command.

15. The system of claim 2, further comprising an arbitration module to grant access to one of the first DMA channel and the second DMA channel based on a channel request priority among the first DMA channel and the second DMA channel.

16. The system of claim 1, wherein the command module includes a write data module to reformat the first data format and the second data format to the third data format.

17. The system of claim 16, further comprising a timing module, wherein the write data module inserts byte parity into the data packets and the timing module verifies the byte parity.

18. The system of claim 17, wherein the timing module detects an error when:
the data packets include padded data corresponding to a first mask bit that is reset; and
the data packets include at least one of (i) first channel data associated with a second mask bit that is set and (ii) second channel data associated with a third mask bit that is set.

19. The system of claim 16, further comprising a write first-in-first-out (FIFO) module to store a portion of each of the data packets until the write data module completely translates one of the first channel data and the second channel data to the third data format, wherein a size of the write FIFO module adapts to a size of one of the data packets translated by the write data module.

20. The system of claim 19, wherein the burst module transfers one of the data packets to the buffer memory when the write data module completely translates one of the first channel data and the second channel data to the third data format.

21. The system of claim 20, wherein the burst module stops transferring one of the data packets when the burst module detects an empty signal from the write FIFO module.

22. The system of claim 16, further comprising a refresh request module to request at least one of refresh cycles and programmable refresh cycles based on information supplied by an internal interface, wherein the refresh request module uses a distributed refresh technique.

23. The system of claim 1, wherein the command module operates on a buffer control clock and the buffer memory operates on a buffer clock, and the buffer control clock operates at one of a rate of the buffer clock and double the rate of the buffer clock.

24. The system of claim 1, wherein the single write burst writes the data packets to a location in the buffer memory that begins at an even address of the buffer memory.

25. A buffer control method for a hard disk drive (HDD), the method comprising:
storing data in a buffer memory, the data being transferred between a first host and the HDD;
receiving first channel data from a first direct memory access (DMA) channel of the first host, the first channel data having a first data format;
receiving second channel data from a second DMA channel of the first host, the second channel data having a second data format, wherein the first channel data and the second channel data correspond to the data being transferred between the first host and the HDD, and wherein the first data format and the second data format are different data formats;
converting the first channel data and the second channel data to respective data packets, each of the data packets having a same third data format that is different than each of the first data format and the second data format, the third format being associated with the buffer memory; and in a single write burst, selectively transmitting the data packets having the third data format to the buffer memory.

26. The method of claim 25, further comprising:
receiving the data packets from the buffer memory; and
converting each of the data packets to at least one of (i) the first channel data having the first data format and (ii) the second channel data having the second data format.

27. The method of claim 26, wherein the third data format includes a data packet length of two units or four units and includes data stored to the buffer beginning at an even address boundary of the buffer memory, wherein each unit of the two units and the four units corresponds to a data qualifier strobe signal.

28. The method of claim 26, wherein the conversion of the data packets is based on at least one of a size of one of the data packets, an alignment of a first-in-first-out (FIFO) memory of one of the first DMA channel and the second DMA channel, an initial address of the buffer memory, and a length of one of the data packets.

29. The method of claim 26, further comprising performing delay alignment functions on data that is at least one of transmitted from the buffer memory and transmitted to the buffer memory, wherein the delay alignment functions include delaying data qualifier signals based on digital locked loops.

30. The method of claim 26, further comprising receiving at least one of the data packets from the buffer memory and converting the at least one of the data packets from a data qualifier signal domain to a memory control clock domain.

31. The method of claim 30, further comprising performing duplicate error detection using at least one pair of capture flip-flops.

32. The method of claim 30, further comprising inserting byte parity in at least one of the data packets.

33. The method of claim 30, further comprising modifying an alignment and an address of at least one of the data packets.

34. The method of claim 26, further comprising controlling a tenure state, wherein the tenure state includes one of an active state, a pause state, and an idle state.

35. The method of claim 34, further comprising generating a decoded address signal based on an initial channel address of one of the first DMA channel and the second DMA channel.

36. The method of claim 26, further comprising executing a plurality of protocol commands of the buffer memory, wherein each of the protocol commands include at least one of an activate command, a write command, a read command, a self refresh command, a buffer initialization command, a pre-charge command, and a digitally locked loop initialization command.

37. The method of claim 36, further comprising entering a wait state before executing consecutive ones of the protocol commands.

38. The method of claim 36, generating an adjustment time parameter to provide a counter for at least one of a new protocol command and a missing protocol command.

39. The method of claim 26, further comprising granting access to one of the first DMA channel and the second DMA channel based on a channel request priority among the first DMA channel and the second DMA channel.

40. The method of claim 25, further comprising reformatting the first data format and the second data format to the third data format.

41. The method of claim 40, further comprising inserting byte parity into the data packets and verifying the byte parity.

42. The method of claim 41, further comprising detecting an error when the data packets include padded data corresponding to a first mask bit that is reset and detecting an error when the data packets include at least one of first channel data associated with a second mask bit that is set and second channel data associated with a third mask bit that is set.

43. The method of claim 40, further comprising storing a portion of each of the data packets until one of the first channel data and the second channel data is completely translated to the third data format and adapting to a size of one of the data packets.

44. The method of claim 43, further comprising transferring one of the data packets to the buffer memory when one of the first channel data and the second channel data is completely translated to the third data format.

45. The method of claim 44, further comprising stopping transferring one of the data packets when an empty signal is detected.

46. The method of claim 40, further comprising requesting at least one of refresh cycles and programmable refresh cycles using a distributed refresh technique based on information supplied by an internal interface.

47. The method of claim 25, further comprising operating on a buffer control clock and the buffer memory operating on a buffer clock, wherein the buffer control clock operates at one of a rate of the buffer clock and double the rate of the buffer clock.

48. The method of claim 25, wherein the single write burst writes the data packets to a location in the buffer memory that begins at an even address of the buffer memory.

\* \* \* \* \*